United States Patent
Inoue et al.

(10) Patent No.: US 9,035,001 B2
(45) Date of Patent: May 19, 2015

(54) DIENE POLYMER AND PRODUCTION METHOD THEREOF

(75) Inventors: Satoru Inoue, Kobe (JP); Kazuyuki Nishioka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 500 days.

(21) Appl. No.: 13/445,175

(22) Filed: Apr. 12, 2012

(65) Prior Publication Data

US 2012/0264898 A1    Oct. 18, 2012

(30) Foreign Application Priority Data

Apr. 13, 2011    (JP) .................................. 2011-089182

(51) Int. Cl.
*C08F 236/04*    (2006.01)
*B60C 1/00*    (2006.01)
*C08F 236/10*    (2006.01)
*C08F 236/06*    (2006.01)
*C08F 236/08*    (2006.01)

(52) U.S. Cl.
CPC ................ *B60C 1/00* (2013.01); *C08F 236/04* (2013.01); *C08F 236/06* (2013.01); *C08F 236/08* (2013.01); *C08F 236/045* (2013.01); *C08F 236/10* (2013.01)

(58) Field of Classification Search
None
See application file for complete search history.

(56) References Cited

U.S. PATENT DOCUMENTS

2007/0167555 A1 *   7/2007   Amino et al. ................. 524/495
2011/0281130 A1 *  11/2011   Evstatieva et al. ......... 428/537.5

FOREIGN PATENT DOCUMENTS

| JP | 5-186508 A | 7/1993 |
|---|---|---|
| JP | 2002-69106 A | 3/2002 |
| JP | 2005-126604 A | 5/2005 |
| JP | 2010-77416 A | 4/2010 |
| JP | 2010-106214 A | 5/2010 |
| JP | 2010-116546 A | 5/2010 |
| JP | 2010-116556 A | 5/2010 |
| WO | WO 2010/094641 A1 | 8/2010 |

* cited by examiner

*Primary Examiner* — Richard A Huhn
(74) *Attorney, Agent, or Firm* — Birch, Stewart, Kolasch & Birch, LLP

(57) ABSTRACT

The present invention provides a diene polymer in which a polar functional group is introduced into an end by radical polymerization, and its production method; a polymer emulsion and a rubber composition each containing the diene polymer; and a pneumatic tire containing the rubber composition. The present invention relates to a diene polymer, which is obtained by radical polymerization of at least one radical polymerizable monomer in the presence of at least one polar functional group-containing thiol compound, and has a polar functional group at at least one end: The polar functional group-containing thiol compound is preferably represented by formula (1):

$$X-R^1-SH \qquad (1)$$

wherein X represents an ester group, a hydroxyl group, a carboxyl group, an amino group, or an alkoxysilyl group, and $R^1$ represents an alkylene or arylene group which may have a substituent.

5 Claims, No Drawings

DIENE POLYMER AND PRODUCTION METHOD THEREOF

TECHNICAL FIELD

The present invention relates to a diene polymer and its production method; a polymer emulsion and a rubber composition each containing the diene polymer; and a pneumatic tire containing the rubber composition.

BACKGROUND ART

It is desirable for rubber compositions for tire components to have better performances including fuel economy and wet grip performance. Known as a technique for improving these performances is a technique of introducing a polar functional group into a main chain or an end of rubber (diene polymer) to control the properties of rubber. Particularly in the case where a polar functional group is introduced into an end of rubber, the energy loss caused by movement of the end is reduced, thereby resulting in significant improvement in fuel economy.

Rubber is generally polymerized through ionic polymerization or radical polymerization. Since ionic polymerization has high flexibility in the molecular design of the microstructure of rubber, the above-mentioned technique of introducing a polar functional group into a main chain or an end of rubber has been accomplished via ionic polymerization. For example, Patent Document 1 discloses a rubber in which a polar functional group is introduced into an end, and Patent Document 2 discloses a rubber in which a polar functional group is introduced into both a main chain and an end. However, the ionic polymerization still has room for improvement, generally, in that the processability is likely to deteriorate because the obtained molecular weight distribution is narrow, and that the production cost is high.

On the other hand, radical polymerization has been industrially widely used because of its easy handling. Use of radical polymerization enables production of a polymer having a broad and unimodal molecular weight distribution and good processability. However, with respect to the radical polymerization which has no livingness, although there is known a technique of introducing a polar functional group into a main chain of rubber by copolymerization of a diene monomer and a polar functional group-containing monomer, a technique of introducing a polar functional group into an end to increase the functions of a diene polymer has not been accomplished.

Patent Document 1: JP 2005-126604 A
Patent Document 2: JP 2010-116546 A

SUMMARY OF THE INVENTION

The present invention solves the above-mentioned problems, and it is an object of the present invention to provide a diene polymer in which a polar functional group is introduced into an end by radical polymerization, and its production method; a polymer emulsion and a rubber composition each containing the diene polymer; and a pneumatic tire containing the rubber composition.

The present inventors have investigated a technique of introducing a polar functional group into an end of a polymer by versatile radical polymerization, and have focused on a molecular weight regulator used in order to control the molecular weight of a polymer in radical polymerization. They have found that in the case where a polar functional group-containing thiol compound is used as the molecular weight regulator, a diene polymer in which a polar functional group is introduced into an end is readily obtainable via radical polymerization.

That is, the present invention relates to a diene polymer, which is obtained by radical polymerization of at least one radical polymerizable monomer in the presence of at least one polar functional group-containing thiol compound, and has a polar functional group at at least one end.

The polar functional group-containing thiol compound is preferably represented by formula (1):

$$X-R^1-SH \qquad (1)$$

wherein X represents an ester group, a hydroxyl group, a carboxyl group, an amino group, or an alkoxysilyl group, and $R^1$ represents an alkylene or arylene group which may have a substituent.

The diene polymer preferably has a polar functional group at a main chain and at least-one end.

The radical polymerizable monomer is preferably a combination of at least one diene monomer and at least one styrene monomer.

The radical polymerizable monomer is preferably a combination of at least one diene monomer, at least one styrene monomer, and at least one polar functional group-containing monomer.

The present invention also relates to a method for producing the diene polymer, comprising emulsifying the radical polymerizable monomer in water using at least one emulsifier in the presence of the polar functional group-containing thiol compound, and adding at least one radical initiator to the resultant emulsion for radical polymerization.

The present invention also relates to a polymer emulsion comprising the diene polymer.

The present invention also relates to a rubber composition comprising the diene polymer.

The present invention also relates to a pneumatic tire comprising the diene polymer.

The present invention provides a diene polymer, which is obtained by radical polymerization of at least one radical polymerizable monomer in the presence of at least one polar functional group-containing thiol compound, and has a polar functional group at at-least one end; and its production method. According to the present invention, higher performance of a diene polymer and more reduction in its production cost are achieved at the same time.

Further, in the case where a polymer emulsion containing the diene polymer is used for a wet masterbatch, the development which has been difficult to realize by a usual kneading method (for example, the creation of a new material using a high molecular weight polymer and the evolution of a new function by morphology control) and the reduction in environmental load in a kneading process are expectable.

Further, a rubber composition containing the diene polymer can achieve the fuel economy, abrasion resistance, and wet grip performance at high levels in a balanced manner. Therefore, it is possible to provide a pneumatic tire excellent in such performances by using the rubber composition.

BEST MODE FOR CARRYING OUT THE INVENTION

<Diene Polymer>

The diene polymer of the present invention is obtained by radical polymerization of a radical polymerizable monomer in the presence of a polar functional group-containing thiol compound. Since the thiol proton of the polar functional group-containing thiol compound is abstracted to generate a radical, the polar functional group-containing thiol compound can function as a molecular weight regulator (chain transfer agent) in the same manner as general molecular weight regulators such as tert-dodecyl mercaptan. In addition, the radical generated from the polar functional group-containing thiol compound reacts with a radical polymerizable monomer to initiate a chain reaction, which means that a polar functional group in the polar functional group-containing thiol compound is introduced into the initiation end of the diene polymer. Thus, a diene polymer having a polar functional group at an end can be obtained via versatile radical polymerization.

The polar functional group-containing thiol compound is not particularly limited as long as it is as compound having a polar functional group (—X) and a thiol group (—SH). Compounds represented by formula (1) can be suitably used.

wherein X represents an ester group, a hydroxyl group (—OH), a carboxyl group (—COOH), an amino group, or an alkoxysilyl group, and $R^1$ represents an alkylene or arylene group which may have a substituent.

The alkylene group of $R^1$ may be linear, branched, or cyclic. Examples of the linear alkylene group include a methylene group, an ethylene group, an n-propylene group, an n-butylene group, an n-pentylene group, and an n-hexylene group. Examples of the branched alkylene group include an isopropylene group and a 2-ethylhexylene group. Examples of the cyclic alkylene group include a cyclopropylene group and a cyclobutylene group. The alkylene group may have a substituent.

The alkylene group preferably has a carbon number of 1 to 20 and more preferably 2 to 18 because the effects of the present invention can be favorably exerted.

Examples of the arylene group of $R^1$ include a phenylene group, a tolylene group, a xylene group, a naphthylene group, and a biphenylene group. The arylene group may have a substituent.

Examples of the ester group of X include groups represented by formula (2-1) or (2-2):

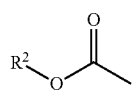

wherein $R^2$ represents an alkyl group or an aryl group; or

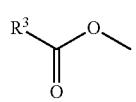

wherein $R^3$ represents a hydrogen atom, an alkyl group, or an aryl group.

The alkyl group of $R^2$ or $R^3$ may be linear, branched, or cyclic. Examples of the linear alkyl group include a methyl group, an ethyl group, an n-propyl group, an n-butyl group, an n-pentyl group, and an n-hexyl group. Examples of the branched alkyl group include an isopropyl group, an isobutyl group, and a 2-ethylhexyl group. Examples of the cyclic alkyl group include a cyclopropyl group and a cyclobutyl group. The alkyl group may have a substituent.

The alkyl group preferably has a carbon number of 1 to 20 and more preferably 2 to 18 because the effects of the present invention can be favorably exerted.

Examples of the aryl group of $R^2$ or $R^3$ include a phenyl group, a tolyl group, a xylyl group, a naphthyl group, and a biphenyl group. The aryl group may be a group formed by substitution of a hydrogen atom of a group mentioned.

Examples of the amino group of X include groups represented by formula (3):

wherein $R^4$ and $R^5$ each represent a hydrogen atom, an alkyl group, or an aryl group; and $R^4$ and $R^5$ may form a ring structure.

Examples of the alkyl group and aryl group of $R^4$ or $R^5$ include those mentioned as examples for $R^2$ or $R^3$. $R^4$ and $R^5$ may form a ring structure, for example, by forming a pyrrole ring with N shown in formula (3).

The alkyl group preferably has a carbon number of 1 to 12 and more preferably 1 to 4, and the aryl group preferably has a carbon number of 6 to 18 and more preferably 6 to 8, because the effects of the present invention can be favorably exerted.

Examples of the alkoxysilyl group of X include groups represented by formula (4):

wherein $R^6$ represents an alkyl group, $R^7$ represents a hydrogen atom or an alkyl group, and p is an integer of 1 to 3

Examples of the alkyl group of $R^6$ or $R^7$ include those mentioned as examples for $R^2$ or $R^3$.

The alkyl group preferably has a carbon number of 1 to 12, and more preferably 1 to 4 because the effects of the present invention can be favorably exerted.

Specific examples of the compound represented by formula (1) include: compounds in which X is an ester group, such as 2-ethylhexyl mercaptopropionate and 2-mercaptoethyl octanoate; compounds in which X is a hydroxyl group, such as 9-mercapto-1-nonanol and 11-mercapto-1-undecanol; compounds in which X is a carboxyl group, such as 11-mercaptoundecanoic acid and 16-mercaptohexadecanoic acid; compounds in which X is an amino group, such as 11-amino-1-undecanethiol and 1H-pyrrole-1-undecanethiol; and compounds in which X is an alkoxysilyl group, such as 3-mercaptopropyltriethoxysilane and 3-mercaptopropyl(dimethoxy)methylsilane.

Examples of radical polymerizable monomers usable in the present invention include diene monomers and styrene monomers. Examples of the diene monomer include butadiene, isoprene, and myrcene. Examples of the styrene monomer include styrene, α-methylstyrene, and methoxystyrene. From the viewpoint of better performance in use for tires, the radical polymerizable monomer is preferably a diene monomer, and more preferably a combination of a diene monomer and a styrene monomer.

The radical polymerizable monomer is preferably a combination of a polar functional group-containing monomer with a diene monomer and a styrene monomer. As a result, a diene polymer having a polar functional group at a main chain and an end is obtained, which means the obtaining of a diene polymer having further higher performance.

As the polar functional group-containing monomer, monomer having a polar functional group and a polymerizable unsaturated bond may be suitably used. Examples of the polar functional group include an ester group, a hydroxyl group, a carboxyl group, an amino group, and an alkoxysilyl group. Among these, an ester group, a carboxyl group, and an amino group are preferable as the polar functional group because the effects of the present invention can be favorably exerted. Specific examples of the polar functional group-containing monomer include 2-(dimethylamino)ethyl acrylate, 2-hydroxyethyl acrylate, and N-(2-hydroxyethyl)acrylamide.

The amount of the diene monomer in polymerized form in the diene polymer of the present invention is not particularly limited, and may be appropriately adjusted according to the amount of other components. The amount is preferably 50% by mass or more, and more preferably 55% by mass or more. The amount is preferably 90% by mass or less, and more preferably 80% by mass or less. If the amount is within the above range, the effects of the present invention can be favorably exerted.

If the diene polymer of the present invention is derived from a styrene monomer, the amount of the styrene monomer in polymerized form in the diene polymer is preferably 10% by mass or more, and more preferably 20% by mass or more. The amount is preferably 50% by mass or less, and more preferably 45% by mass or less. If the amount is outside the above range, the diene polymer of the present invention when used for tires may not achieve good fuel economy, abrasion resistance, and wet grip performance in a balanced manner.

If the diene polymer of the present invention is derived from a polar functional group-containing monomer, the amount of the polar functional group-containing monomer in polymerized form in the diene polymer is preferably 0.001% by mass or more, and more preferably 0.01% by mass or more. The amount is preferably 20% by mass or less, and more preferably 10% by mass or less. If the amount is outside the above range, the diene polymer of the present invention when used for tires may not achieve good fuel economy, abrasion resistance and wet grip performance in a balanced manner.

The amounts of the diene monomer, the styrene monomer, and the polar functional group-containing monomer in polymerized form in the diene polymer of the present invention can be determined as described in Examples below.

The molecular weight distribution, Mw (weight average molecular weight)/Mn (number average molecular weight), of the diene polymer of the present invention is preferably 2 or more, and more preferably 3 or more. The Mw/Mn is preferably 6 or less, and more preferably 5 or less. If the Mw/Mn is less than the lower limit, the processability may deteriorate. Meanwhile, if the Mw/Mn exceeds the upper limit, good fuel economy, abrasion resistance and wet grip performance may not be achieved in a balanced manner.

The peak top molecular weight Mp of the diene polymer of the present invention is preferably 150,000 or more, and more preferably 200,000 or more. The Mp is preferably 500,000 or less, and more preferably 450,000 or less. If the Mp is less than the lower limit, the fuel economy and abrasion resistance may not be improved in a balanced manner. Meanwhile, if the Mp exceeds the upper limit, the processability may deteriorate.

The Mw, Mn, and Mp of the diene polymer of the present invention can be determined as described in Examples below.

<Method for Producing Diene Polymer>

The diene polymer of the present invention can be particularly suitably obtained by emulsion polymerization. For example, the diene polymer can be suitably obtained by a production method including emulsifying the radical polymerizable monomer in water using an emulsifier in the presence of the polar functional group-containing thiol compound, and adding a radical initiator to the resultant emulsion for radical polymerization.

The emulsion can be prepared by emulsification by a known method using an emulsifier. The emulsifier is not particularly limited, and may be a known material. Examples thereof include fatty acid salts and rosin acid salts. Examples of the fatty acid salt and rosin acid salt include potassium or sodium salts of capric acid, lauric acid, myristic acid, or the like acid.

The emulsion polymerization may be performed by a known method using a radical polymerization initiator. The radical polymerization initiator is not particularly limited, and may be a known material. Examples thereof include redox initiators such as paramenthane hydroperoxide, and persulfates such as ammonium persulfate.

The temperature of emulsion polymerization may be appropriately adjusted according to the kind of radical initiator to be used, and is preferably 0-50° C. and more preferably 0-20° C.

The emulsion polymerization can be stopped by adding a polymerization terminator to the polymerization system. The polymerization terminator is not particularly limited, and may be a known material. Examples thereof include N,N'-dimethyldithiocarbamate, diethylhydroxylamine, and hydroquinone.

After stopping the emulsion polymerization, a polymer latex (polymer emulsion) in which the diene polymer is dispersed is obtained. After removing unreacted monomers from the latex if necessary, an acid, if necessary, is added and mixed to adjust the pH of the latex to a predetermined value. Then, the latex is coagulated to give a crumb diene polymer.

<Polymer Emulsion>

The polymer emulsion of the present invention is a dispersion containing the diene polymer, and can be obtained in the production of the diene polymer mentioned above. The polymer emulsion may be suitably used for a wet masterbatch. As a result, the development which has been difficult to realize by a usual kneading method and the reduction in environmental load in a kneading process are expectable.

<Rubber Composition>

The diene polymer may be used as a rubber contained in the rubber component of a rubber composition. The amount of the diene polymer in 100% by mass of the rubber component is preferably 30% by mass or more, and more preferably 60% by mass or more. If the amount is less than 30% by mass, the effect of blending the diene polymer tends to be insufficiently exerted. The upper limit of the amount of the diene polymer is not particularly limited, and is preferably 90% by mass or less, and more preferably 80% by mass or less.

The diene polymer may be used in combination with other rubbers. Examples of the other rubbers include diene rubbers such as natural rubber (NR), butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR). NR is preferable among these because good fuel economy, wet grip performance, and abrasion resistance can be achieved in a balanced manner.

The amount of NR in 100% by mass of the rubber component is preferably 10% by mass or more, and more preferably 20% by mass or more. The amount is preferably 70% by mass or less, and more preferably 40% by mass or less. If the amount is within the range, good fuel economy, wet grip performance, and abrasion resistance can be achieved in a balanced manner.

The rubber composition of the present invention preferably contains silica. The diene polymer promotes dispersion of silica, resulting in further improvement in the fuel economy, wet grip performance, and abrasion resistance. Usable silica is not particularly limited, and those generally used in the tire industry may be used. In addition, silica may preferably be used in combination with a known silane coupling agent.

The nitrogen adsorption specific surface area ($N_2SA$) of silica is preferably 100 $m^2/g$ or more, and more preferably 150 $m^2/g$ or more. If the $N_2SA$ is less than 100 $m^2/g$, the reinforcing effect tends to be low, and thus the abrasion resistance tends to be insufficiently improved. The $N_2SA$ of silica is preferably 300 $m^2/g$ or less, and more preferably 200 $m^2/g$ or less. If the $N_2SA$ is more than 300 $m^2/g$, the silica is less likely to be dispersed, and thus the fuel economy tends to deteriorate.

The nitrogen adsorption specific surface area of silica can be determined by the BET method in conformity with ASTM D3037-81.

The amount of silica is preferably 15 parts by mass or more, and more preferably 25 parts by mass or more, per 100 parts by mass of the rubber component. If the amount is less than 15 parts by mass, sufficient abrasion resistance tends not to be achieved. The amount of silica is preferably 60 parts by mass or less, and more preferably 40 parts by mass or less, per 100 parts by mass of the rubber component. If the amount exceeds 60 parts by mass, the silica is less likely to be dispersed, and thus the fuel economy tends to deteriorate.

The rubber composition of the present invention preferably contains carbon black. If the rubber composition contains carbon black, the reinforcement improves, and the effects of the present invention can be favorably exerted.

The nitrogen adsorption specific surface area ($N_2SA$) of carbon black is preferably 80 $m^2/g$ or more, and more preferably 100 $m^2/g$ or more. If the $N_2SA$ is less than 80 $m^2/g$, the reinforcing effect tends to be low, and thus the abrasion resistance tends to be insufficiently improved. The $N_2SA$ of carbon black is preferably 200 $m^2/g$ or less, and more preferably 150 $m^2/g$ or less. If the $N_2SA$ is more than 200 $m^2/g$, the carbon black is less likely to be dispersed, and thus the fuel economy tends to deteriorate.

The nitrogen adsorption specific surface area of carbon black is determined in accordance with the A method of JIS K6217.

The amount of carbon black is preferably 15 parts by mass or more, and more preferably 25 parts by mass or more, per 100 parts by mass of the rubber component. If the amount is less than 15 parts by mass, sufficient abrasion resistance tends not to be achieved. The amount of carbon black is preferably 60 parts by mass or less, and more preferably 40 parts by mass or less, per 100 parts by mass of the rubber component. If the amount exceeds 60 parts by mass, the carbon black is less likely to be dispersed, and thus the fuel economy tends to deteriorate.

The total amount of carbon black and silica is preferably 30 parts by mass or more, and more preferably 50 parts by mass or more, per 100 parts by mass of the rubber component. The total amount is preferably 120 parts by mass or less, and more preferably 80 parts by mass or less, per 100 parts by mass of the rubber component. If the total amount is within the above range, good abrasion resistance can be achieved. In addition, combined use of the above amount of filler with the diene polymer can lead to good fuel economy without the need to reduce the usual amount of filler.

In addition to the above materials, the rubber composition of the present invention may contain various materials generally used in the tire industry, such as oil, zinc oxide, stearic acid, an antioxidant, and a vulcanization accelerator, as appropriate.

The rubber composition of the present invention can be produced by a usual method. That is, the composition may be produced, for example, by a method in which the components are kneaded with an apparatus such as a Banbury mixer, a kneader, or an open roll mill, and the kneaded mixture is then vulcanized.

Using the thus-obtained rubber composition, a pneumatic tire whose fuel economy, wet grip performance, and abrasion resistance are improved in a balanced manner can be provided. The rubber composition can be used for various tire components; in particular, the composition is suitably used for treads, sidewalls, and the like.

<Pneumatic Tire>

The pneumatic tire of the present invention can be produced using the rubber composition by a usual method.

Specifically, a rubber composition formed by mixing the components is extruded and processed into the shape of a tire component such as a tread before vulcanization; this tire component is assembled with other tire components, and molded on a tire building machine in a usual manner to form an unvulcanized tire. Then, the unvulcanized tire is heated and pressurized in a vulcanizer so that a pneumatic tire is produced.

EXAMPLES

The present invention will be described in detail based on examples; the present invention is not limited to these examples.

Hereinafter, the chemicals used in synthesis of diene polymer (hereinafter, simply referred to as "polymer") are listed.

Water: distilled water

Emulsifier (1): rosin acid soap produced by Harima Chemicals, Inc.

Emulsifier (2): fatty acid soap produced by Wako Pure Chemical Industries, Ltd.

Electrolyte: sodium phosphate produced by Wako Pure Chemical Industries, Ltd.

Styrene: styrene produced by Wako Pure Chemical Industries, Ltd.

Butadiene: 1,3-butadiene produced by Takachiho Chemical Industrial Co., Ltd.

Polar group-containing monomer: 2-(dimethylamino) ethyl acrylate produced by Tokyo Chemical Industry Co., Ltd.

Molecular weight regulator: tert-dodecyl mercaptan produced by Wako Pure Chemical Industries, Ltd.

End modifier (1): 2-ethylhexyl mercaptopropionate produced by Wako Pure Chemical Industries, Ltd.

End modifier (2): 2-mercaptoethyl octanoate produced by Wako Pure Chemical Industries, Ltd.

End modifier (3): 9-mercapto-1-nonanol produced by Sigma-Aldrich Japan K.K.

End modifier (4): 11-mercapto-1-undecanol produced by Sigma-Aldrich Japan K.K.

End modifier (5): 11-mercaptoundecanoic acid produced by Sigma-Aldrich Japan K.K.

End modifier (6): 16-mercaptohexadecanoic acid produced by Sigma-Aldrich Japan K.K.

End modifier (7): 11-amino-1-undecanethiol produced by Sigma-Aldrich Japan K.K.

End modifier (8): 1H-pyrrole-1-undecanethiol produced by Sigma-Aldrich Japan K.K.

End modifier (9): 3-mercaptopropyltriethoxysilane produced by Tokyo Chemical Industry Co., Ltd.

End modifier (10): 3-mercaptopropyl(dimethoxy)methylsilane produced by Tokyo Chemical Industry Co., Ltd.

Radical initiator: paramenthane hydroperoxide produced by NOF Corporation

SFS: sodium formaldehyde sulfoxylate produced by Wako Pure Chemical Industries, Ltd.

EDTA: sodium ethylenediaminetetraacetate produced by Wako Pure Chemical Industries, Ltd.

Catalyst: ferric sulfate produced by Wako Pure Chemical Industries, Ltd.

Polymerization terminator: N,N'-dimethyldithiocarbamate produced by Wako Pure Chemical Industries, Ltd.

Alcohol: methanol, ethanol produced by Kanto Chemical Co., Inc.

Formic acid: formic acid produced by Kanto Chemical Co., Inc.

Sodium chloride: sodium chloride produced by Wako Pure Chemical Industries, Ltd.

<Synthesis of Polymer>

(Synthesis of Polymer (1))

According to the charged amounts shown in Table 1, the water, emulsifier (1), emulsifier (2), electrolyte, styrene, butadiene, and molecular weight regulator were charged into a pressure-resistant reactor provided with a stirrer. The reactor temperature was set to 5° C., an aqueous solution of the radical initiator and SFS and an aqueous solution of the EDTA and catalyst were added to the reactor, so that the polymerization was initiated. Five hours after the initiation of polymerization, the polymerization terminator was added to stop the reaction, whereby a latex was produced.

Unreacted monomers were removed from the produced latex by steam distillation. Then, the latex was added to the alcohol, and adjusted to a pH of 3 to 5 with a saturated aqueous sodium chloride or the formic acid to cause coagulation, whereby a crumb polymer (1) was produced. The polymer (1) was dried with a 40° C. vacuum dryer, whereby a solid rubber was obtained.

(Synthesis of Polymers (2) to (11))

Polymers (2) to (11) were produced using the charged amounts shown in Table 1 by the same method as that of the polymer (1), except that instead of the molecular weight regulator, the end modifier was charged in a polymerization system.

(Synthesis of Polymers (12) to (21))

Polymers (12) to (21) were produced using the charged amounts shown in Table 1 by the same method as that of the polymer (1), except that the end modifier was used instead of the molecular weight regulator, and was aliquoted and charged in a polymerization system at the rate of one aliquot per hour.

(Synthesis of Polymer (22))

A polymer (22) was produced using the charged amounts shown in Table 2 by the same method as that of the polymer (1), except that the polar group-containing monomer was added upon polymerization.

(Synthesis of Polymers (23) to (32))

Polymers (23) to (32) were produced using the charged amounts shown in Table 2 by the same method as that of the polymer (22), except that instead of the molecular weight regulator, the end modifier was charged in a polymerization system.

(Synthesis of Polymers (33) to (42))

Polymers (33) to (42) were produced using the charged amounts shown in Table 2 by the same method as that of the polymer (22), except that the end modifier was used instead of the molecular weight regulator, and was aliquoted and charged in a polymerization system at the rate of one aliquot per hour.

<Analysis of Polymer>

The thus-obtained polymers were analyzed by the following method.

(Determination of Molecular Weight Distribution Mw/Mn and Peak Top Molecular Weight Mp)

The molecular weight distribution Mw/Mn and peak top molecular weight Mp of the polymers were determined with a gel permeation chromatograph (GPC) (GPC-8000 series produced by TOSOH Corporation, detector: differential refractometer, column: TSKGEL SUPERMALTPORE HZ-M produced by TOSOH Corporation) and calibrated with polystyrene standards.

(Microstructure Identification)

A measurement was performed on the polymers with an apparatus of JNM-ECA series produced by JEOL Ltd. for the identification of the microstructure. Based on the measurement results, the amounts (% by mass) of styrene and polar functional group-containing monomer in polymerized form in the polymer was derived were calculated.

TABLE 1

|  |  | Polymers | | | | | | | | | | |
|---|---|---|---|---|---|---|---|---|---|---|---|---|
|  |  | (1) | (2) | (3) | (4) | (5) | (6) | (7) | (8) | (9) | (10) | (11) |
| Charged amounts (part(s) by mass) | Water | 200 | 200 | 200 | 200 | 200 | 200 | 200 | 200 | 200 | 200 | 200 |
|  | Emulsifier (1) | 4.5 | 4.5 | 4.5 | 4.5 | 4.5 | 4.5 | 4.5 | 4.5 | 4.5 | 4.5 | 4.5 |
|  | Emulsifier (2) | 0.15 | 0.15 | 0.15 | 0.15 | 0.15 | 0.15 | 0.15 | 0.15 | 0.15 | 0.15 | 0.15 |
|  | Electrolyte | 0.8 | 0.8 | 0.8 | 0.8 | 0.8 | 0.8 | 0.8 | 0.8 | 0.8 | 0.8 | 0.8 |
|  | Styrene | 25 | 25 | 25 | 25 | 25 | 25 | 25 | 25 | 25 | 25 | 25 |
|  | Butadiene | 75 | 75 | 75 | 75 | 75 | 75 | 75 | 75 | 75 | 75 | 75 |
|  | Molecular weight regulator | 0.2 | — | — | — | — | — | — | — | — | — | — |
|  | End modifier Number | — | (1) | (2) | (3) | (4) | (5) | (6) | (7) | (8) | (9) | (10) |
|  | Amount | — | 0.2 | 0.2 | 0.2 | 0.2 | 0.2 | 0.2 | 0.2 | 0.2 | 0.2 | 0.2 |
|  | Radical initiator | 0.1 | 0.1 | 0.1 | 0.1 | 0.1 | 0.1 | 0.1 | 0.1 | 0.1 | 0.1 | 0.1 |
|  | SFS | 0.15 | 0.15 | 0.15 | 0.15 | 0.15 | 0.15 | 0.15 | 0.15 | 0.15 | 0.15 | 0.15 |
|  | EDTA | 0.07 | 0.07 | 0.07 | 0.07 | 0.07 | 0.07 | 0.07 | 0.07 | 0.07 | 0.07 | 0.07 |
|  | Catalyst | 0.05 | 0.05 | 0.05 | 0.05 | 0.05 | 0.05 | 0.05 | 0.05 | 0.05 | 0.05 | 0.05 |
|  | Polymerization terminator | 0.2 | 0.2 | 0.2 | 0.2 | 0.2 | 0.2 | 0.2 | 0.2 | 0.2 | 0.2 | 0.2 |

TABLE 1-continued

| | | | | | | | | | | | |
|---|---|---|---|---|---|---|---|---|---|---|---|
| Mw/Mn | | 3.2 | 3.7 | 3.4 | 3.4 | 3.9 | 3.7 | 3.2 | 3.0 | 3.5 | 3.8 | 3.8 |
| Mp (×10$^4$) | | 27 | 25 | 25 | 23 | 23 | 27 | 30 | 30 | 28 | 30 | 33 |
| Amount of styrene | | 23.1 | 23.6 | 23.2 | 23.9 | 23.9 | 23.6 | 23.8 | 23.5 | 22.9 | 23.6 | 23.5 |

| | | Polymers | | | | | | | | | |
|---|---|---|---|---|---|---|---|---|---|---|---|
| | | (12) | (13) | (14) | (15) | (16) | (17) | (18) | (19) | (20) | (21) |
| Charged amounts (part(s) by mass) | Water | 200 | 200 | 200 | 200 | 200 | 200 | 200 | 200 | 200 | 200 |
| | Emulsifier (1) | 4.5 | 4.5 | 4.5 | 4.5 | 4.5 | 4.5 | 4.5 | 4.5 | 4.5 | 4.5 |
| | Emulsifier (2) | 0.15 | 0.15 | 0.15 | 0.15 | 0.15 | 0.15 | 0.15 | 0.15 | 0.15 | 0.15 |
| | Electrolyte | 0.8 | 0.8 | 0.8 | 0.8 | 0.8 | 0.8 | 0.8 | 0.8 | 0.8 | 0.8 |
| | Styrene | 25 | 25 | 25 | 25 | 25 | 25 | 25 | 25 | 25 | 25 |
| | Butadiene | 75 | 75 | 75 | 75 | 75 | 75 | 75 | 75 | 75 | 75 |
| | Molecular weight regulator | — | — | — | — | — | — | — | — | — | — |
| | End modifier   Number | (1) | (2) | (3) | (4) | (5) | (6) | (7) | (8) | (9) | (10) |
| |                Amount | 0.2 | 0.2 | 0.2 | 0.2 | 0.2 | 0.2 | 0.2 | 0.2 | 0.2 | 0.2 |
| | Radical initiator | 0.1 | 0.1 | 0.1 | 0.1 | 0.1 | 0.1 | 0.1 | 0.1 | 0.1 | 0.1 |
| | SFS | 0.15 | 0.15 | 0.15 | 0.15 | 0.15 | 0.15 | 0.15 | 0.15 | 0.15 | 0.15 |
| | EDTA | 0.07 | 0.07 | 0.07 | 0.07 | 0.07 | 0.07 | 0.07 | 0.07 | 0.07 | 0.07 |
| | Catalyst | 0.05 | 0.05 | 0.05 | 0.05 | 0.05 | 0.05 | 0.05 | 0.05 | 0.05 | 0.05 |
| | Polymerization terminator | 0.2 | 0.2 | 0.2 | 0.2 | 0.2 | 0.2 | 0.2 | 0.2 | 0.2 | 0.2 |
| Mw/Mn | | 4.7 | 4.6 | 4.7 | 4.8 | 4.6 | 4.5 | 4.8 | 4.8 | 4.5 | 4.3 |
| Mp (×10$^4$) | | 43 | 43 | 45 | 45 | 49 | 43 | 49 | 47 | 46 | 47 |
| Amount of styrene | | 23.5 | 23.9 | 23.9 | 23.3 | 23.3 | 23.3 | 23.1 | 23.7 | 23.6 | 23.7 |

TABLE 2

| | | Polymers | | | | | | | | | |
|---|---|---|---|---|---|---|---|---|---|---|---|
| | | (22) | (23) | (24) | (25) | (26) | (27) | (28) | (29) | (30) | (31) | (32) |
| Amount (parts by mass) | Water | 200 | 200 | 200 | 200 | 200 | 200 | 200 | 200 | 200 | 200 | 200 |
| | Emulsifier (1) | 4.5 | 4.5 | 4.5 | 4.5 | 4.5 | 4.5 | 4.5 | 4.5 | 4.5 | 4.5 | 4.5 |
| | Emulsifier (2) | 0.15 | 0.15 | 0.15 | 0.15 | 0.15 | 0.15 | 0.15 | 0.15 | 0.15 | 0.15 | 0.15 |
| | Electrolyte | 0.8 | 0.8 | 0.8 | 0.8 | 0.8 | 0.8 | 0.8 | 0.8 | 0.8 | 0.8 | 0.8 |
| | Styrene | 25 | 25 | 25 | 25 | 25 | 25 | 25 | 25 | 25 | 25 | 25 |
| | Butadiene | 75 | 75 | 75 | 75 | 75 | 75 | 75 | 75 | 75 | 75 | 75 |
| | Polar group-containing monomer | 0.05 | 0.05 | 0.05 | 0.05 | 0.05 | 0.05 | 0.05 | 0.05 | 0.05 | 0.05 | 0.05 |
| | Molecular weight regulator | 0.2 | — | — | — | — | — | — | — | — | — | — |
| | End modifier   Number | — | (1) | (2) | (3) | (4) | (5) | (6) | (7) | (8) | (9) | (10) |
| |                Amount | — | 0.2 | 0.2 | 0.2 | 0.2 | 0.2 | 0.2 | 0.2 | 0.2 | 0.2 | 0.2 |
| | Radical initiator | 0.1 | 0.1 | 0.1 | 0.1 | 0.1 | 0.1 | 0.1 | 0.1 | 0.1 | 0.1 | 0.1 |
| | SFS | 0.15 | 0.15 | 0.15 | 0.15 | 0.15 | 0.15 | 0.15 | 0.15 | 0.15 | 0.15 | 0.15 |
| | EDTA | 0.07 | 0.07 | 0.07 | 0.07 | 0.07 | 0.07 | 0.07 | 0.07 | 0.07 | 0.07 | 0.07 |
| | Catalyst | 0.05 | 0.05 | 0.05 | 0.05 | 0.05 | 0.05 | 0.05 | 0.05 | 0.05 | 0.05 | 0.05 |
| | Polymerization terminator | 0.2 | 0.2 | 0.2 | 0.2 | 0.2 | 0.2 | 0.2 | 0.2 | 0.2 | 0.2 | 0.2 |
| Mw/Mn | | 3.2 | 3.8 | 3.9 | 3.5 | 3.5 | 3.2 | 3.4 | 3.5 | 3.8 | 3.5 | 3.6 |
| Mp (×10$^4$) | | 27 | 26 | 26 | 23 | 29 | 29 | 30 | 26 | 29 | 28 | 33 |
| Amount of styrene | | 23.1 | 23.9 | 23.1 | 23.4 | 23.5 | 23.8 | 23.6 | 23.7 | 23.1 | 23.3 | 23.0 |
| Amount of polar group-containing monomer | | 0.04 | 0.04 | 0.04 | 0.03 | 0.04 | 0.04 | 0.04 | 0.04 | 0.04 | 0.04 | 0.04 |

| | | Polymers | | | | | | | | | |
|---|---|---|---|---|---|---|---|---|---|---|---|
| | | (33) | (34) | (35) | (36) | (37) | (38) | (39) | (40) | (41) | (42) |
| Amount (parts by mass) | Water | 200 | 200 | 200 | 200 | 200 | 200 | 200 | 200 | 200 | 200 |
| | Emulsifier (1) | 4.5 | 4.5 | 4.5 | 4.5 | 4.5 | 4.5 | 4.5 | 4.5 | 4.5 | 4.5 |
| | Emulsifier (2) | 0.15 | 0.15 | 0.15 | 0.15 | 0.15 | 0.15 | 0.15 | 0.15 | 0.15 | 0.15 |
| | Electrolyte | 0.8 | 0.8 | 0.8 | 0.8 | 0.8 | 0.8 | 0.8 | 0.8 | 0.8 | 0.8 |
| | Styrene | 25 | 25 | 25 | 25 | 25 | 25 | 25 | 25 | 25 | 25 |
| | Butadiene | 75 | 75 | 75 | 75 | 75 | 75 | 75 | 75 | 75 | 75 |
| | Polar group-containing monomer | 0.05 | 0.05 | 0.05 | 0.05 | 0.05 | 0.05 | 0.05 | 0.05 | 0.05 | 0.05 |
| | Molecular weight regulator | — | — | — | — | — | — | — | — | — | — |
| | End modifier   Number | (1) | (2) | (3) | (4) | (5) | (6) | (7) | (8) | (9) | (10) |
| |                Amount | 0.2 | 0.2 | 0.2 | 0.2 | 0.2 | 0.2 | 0.2 | 0.2 | 0.2 | 0.2 |
| | Radical initiator | 0.1 | 0.1 | 0.1 | 0.1 | 0.1 | 0.1 | 0.1 | 0.1 | 0.1 | 0.1 |
| | SFS | 0.15 | 0.15 | 0.15 | 0.15 | 0.15 | 0.15 | 0.15 | 0.15 | 0.15 | 0.15 |
| | EDTA | 0.07 | 0.07 | 0.07 | 0.07 | 0.07 | 0.07 | 0.07 | 0.07 | 0.07 | 0.07 |
| | Catalyst | 0.05 | 0.05 | 0.05 | 0.05 | 0.05 | 0.05 | 0.05 | 0.05 | 0.05 | 0.05 |
| | Polymerization terminator | 0.2 | 0.2 | 0.2 | 0.2 | 0.2 | 0.2 | 0.2 | 0.2 | 0.2 | 0.2 |
| Mw/Mn | | 4.5 | 4.5 | 4.3 | 4.3 | 4.3 | 4.6 | 4.6 | 4.6 | 4.5 | 4.4 |
| Mp (×10$^4$) | | 39 | 45 | 46 | 47 | 44 | 48 | 43 | 49 | 43 | 44 |

TABLE 2-continued

| | | | | | | | | | | |
|---|---|---|---|---|---|---|---|---|---|---|
| Amount of styrene | 23.5 | 23.5 | 23.5 | 23.7 | 23.6 | 23.7 | 23.4 | 23.3 | 23.0 | 23.2 |
| Amount of polar group-containing monomer | 0.04 | 0.04 | 0.04 | 0.04 | 0.04 | 0.04 | 0.04 | 0.04 | 0.04 | 0.04 |

EXAMPLES AND COMPARATIVE EXAMPLES

Hereinafter, the chemicals used in examples and comparative examples are listed.
NR: RSS #3
Polymers (1) to (42): synthesized by the above methods
Emulsion-polymerized SBR: SBR1502 produced by JSR Corporation
Carbon black: SHOBLACK N220 produced by Cabot Japan K.K.
Silica: Ultrasil VN3 produced by Degussa
Silane coupling agent: Si69 produced by Degussa
Oil: Process X-140 produced by Japan Energy Corporation
Stearic acid: stearic acid produced by NOF Corporation
Zinc oxide: Zinc oxide #1 produced by Mitsui Mining & Smelting Co., Ltd.
Antioxidant: Nocrac 6C produced by Ouchi Shinko Chemical Industrial Co., Ltd.
Wax: Sunnoc Wax produced by Ouchi Shinko Chemical Industrial Co., Ltd.
Sulfur: sulfur powder produced by Tsurumi Chemical Industry Co., Ltd.
Vulcanization accelerator (1): Nocceler CZ produced by Ouchi Shinko Chemical Industrial Co., Ltd.
Vulcanization accelerator (2): Nocceler D produced by Ouchi Shinko Chemical Industrial Co., Ltd.

The chemicals were mixed and kneaded based on the formulation shown in Table 3 or 4 to produce an unvulcanized rubber composition. The produced unvulcanized rubber composition was press-vulcanized at 170° C. for 20 minutes to produce a vulcanized rubber composition.

The produced unvulcanized rubber compositions and vulcanized rubber compositions were evaluated for the fuel economy, wet grip performance, abrasion resistance, and processability by the test methods described below.

(Fuel Economy (Rolling Resistance))

Using a spectrometer produced by Ueshima Seisakusho Co., Ltd., the tan δ of the vulcanized rubber composition was measured at a temperature of 60° C., a dynamic strain amplitude of 1%, and a frequency of 10 Hz, and was given as an index by the following equation. A larger index value indicates a lower rolling resistance and thus better fuel economy.

(Fuel economy index)=(tan δ of Comparative Example 2)/(tan δ of each formulation)×100

(Abrasion Resistance)

Using a Lambourn abrasion tester, the abrasion loss of the vulcanized rubber composition was measured under the conditions of room temperature, an applied load of 1.0 kgf, and a slip ratio of 30%, and was given as an index by the following equation. A larger index value indicates better abrasion resistance.

(Abrasion resistance index)=(Abrasion loss of Comparative Example 2)/(Abrasion loss of each formulation)×100

(Wet Grip Performance)

The wet grip performance was evaluated using a flat belt friction tester (FR5010 Series) produced by Ueshima Seisakusho Co., Ltd. A cylindrical rubber test piece (width: 20 mm, diameter: 100 mm) of the vulcanized rubber composition was used as a sample. The slip ratio of the sample on road surface was changed in the range of 0 to 70% under the conditions of a speed of 20 km/hour, a load of 4 kgf, and a road surface temperature of 20° C., and the maximum of friction coefficients monitored with that range was read and shown by an index by the following equation. A larger index value indicates better wet grip performance.

(Wet grip performance index)=(maximum of friction coefficients of each formulation)/(maximum of friction coefficients of Comparative Example 2)×100

(Processability)

The Mooney viscosity ($ML_{1+4}$/130° C.) of the unvulcanized rubber composition was determined in accordance with JIS K6300-1 "Rubber, unvulcanized—Physical property—Part 1: Determination of Mooney viscosity and pre-vulcanization characteristics with Mooney viscometer". That is, a Mooney viscosity tester was preheated for 1 minute up to 130° C. and a small rotor was rotated under this temperature condition. After 4-minute rotation, the Mooney viscosity ($ML_{1+4}$/130° C.) was measured. The obtained value was given as an index by the following equation. A larger index value indicates a lower viscosity and thus better processability.

(Processability index)=(Mooney viscosity of Comparative Example 2)/(Mooney viscosity of each formulation)×100

TABLE 3

| | | | Comparative Example | Examples | | | | | | | | | |
|---|---|---|---|---|---|---|---|---|---|---|---|---|---|
| | | | 1 | 1 | 2 | 3 | 4 | 5 | 6 | 7 | 8 | 9 | 10 |
| Formulation (part(s) by mass) | NR | | 30 | 30 | 30 | 30 | 30 | 30 | 30 | 30 | 30 | 30 | 30 |
| | Polymer | Number | (1) | (2) | (3) | (4) | (5) | (6) | (7) | (8) | (9) | (10) | (11) |
| | | Amount | 70 | 70 | 70 | 70 | 70 | 70 | 70 | 70 | 70 | 70 | 70 |
| | Emulsion-polymerized SBR | | — | — | — | — | — | — | — | — | — | — | — |
| | Carbon black | | 30 | 30 | 30 | 30 | 30 | 30 | 30 | 30 | 30 | 30 | 30 |
| | Silica | | 30 | 30 | 30 | 30 | 30 | 30 | 30 | 30 | 30 | 30 | 30 |
| | Silane coupling agent | | 2.4 | 2.4 | 2.4 | 2.4 | 2.4 | 2.4 | 2.4 | 2.4 | 2.4 | 2.4 | 2.4 |
| | Oil | | 5 | 5 | 5 | 5 | 5 | 5 | 5 | 5 | 5 | 5 | 5 |
| | Stearic acid | | 2 | 2 | 2 | 2 | 2 | 2 | 2 | 2 | 2 | 2 | 2 |
| | Zinc oxide | | 3 | 3 | 3 | 3 | 3 | 3 | 3 | 3 | 3 | 3 | 3 |
| | Antioxidant | | 1 | 1 | 1 | 1 | 1 | 1 | 1 | 1 | 1 | 1 | 1 |
| | Wax | | 1 | 1 | 1 | 1 | 1 | 1 | 1 | 1 | 1 | 1 | 1 |

TABLE 3-continued

|  |  |  |  |  |  |  |  |  |  |  |  |  |
|---|---|---|---|---|---|---|---|---|---|---|---|---|
|  | Sulfur | 1.5 | 1.5 | 1.5 | 1.5 | 1.5 | 1.5 | 1.5 | 1.5 | 1.5 | 1.5 | 1.5 |
|  | Vulcanization accelerator (1) | 1 | 1 | 1 | 1 | 1 | 1 | 1 | 1 | 1 | 1 | 1 |
|  | Vulcanization accelerator (2) | 0.5 | 0.5 | 0.5 | 0.5 | 0.5 | 0.5 | 0.5 | 0.5 | 0.5 | 0.5 | 0.5 |
| Evaluation | Fuel economy index | 97 | 109 | 104 | 113 | 113 | 113 | 112 | 115 | 114 | 117 | 117 |
|  | Wet grip performance index | 101 | 100 | 101 | 100 | 102 | 100 | 103 | 101 | 100 | 101 | 100 |
|  | Abrasion resistance index | 101 | 110 | 108 | 112 | 110 | 113 | 109 | 115 | 115 | 116 | 112 |
|  | Processability index | 101 | 101 | 101 | 101 | 102 | 102 | 101 | 100 | 100 | 100 | 100 |

|  |  |  |  | Examples |  |  |  |  |  |  |  |  | Comparative Example |
|---|---|---|---|---|---|---|---|---|---|---|---|---|---|
|  |  |  | 11 | 12 | 13 | 14 | 15 | 16 | 17 | 18 | 19 | 20 | 2 |
| Formulation (part(s) by mass) | NR |  | 30 | 30 | 30 | 30 | 30 | 30 | 30 | 30 | 30 | 30 | 30 |
|  | Polymer | Number | (12) | (13) | (14) | (15) | (16) | (17) | (18) | (19) | (20) | (21) | — |
|  |  | Amount | 70 | 70 | 70 | 70 | 70 | 70 | 70 | 70 | 70 | 70 | — |
|  | Emulsion-polymerized SBR |  | — | — | — | — | — | — | — | — | — | — | 70 |
|  | Carbon black |  | 30 | 30 | 30 | 30 | 30 | 30 | 30 | 30 | 30 | 30 | 30 |
|  | Silica |  | 30 | 30 | 30 | 30 | 30 | 30 | 30 | 30 | 30 | 30 | 30 |
|  | Silane coupling agent |  | 2.4 | 2.4 | 2.4 | 2.4 | 2.4 | 2.4 | 2.4 | 2.4 | 2.4 | 2.4 | 2.4 |
|  | Oil |  | 5 | 5 | 5 | 5 | 5 | 5 | 5 | 5 | 5 | 5 | 5 |
|  | Stearic acid |  | 2 | 2 | 2 | 2 | 2 | 2 | 2 | 2 | 2 | 2 | 2 |
|  | Zinc oxide |  | 3 | 3 | 3 | 3 | 3 | 3 | 3 | 3 | 3 | 3 | 3 |
|  | Antioxidant |  | 1 | 1 | 1 | 1 | 1 | 1 | 1 | 1 | 1 | 1 | 1 |
|  | Wax |  | 1 | 1 | 1 | 1 | 1 | 1 | 1 | 1 | 1 | 1 | 1 |
|  | Sulfur |  | 1.5 | 1.5 | 1.5 | 1.5 | 1.5 | 1.5 | 1.5 | 1.5 | 1.5 | 1.5 | 1.5 |
|  | Vulcanization accelerator (1) |  | 1 | 1 | 1 | 1 | 1 | 1 | 1 | 1 | 1 | 1 | 1 |
|  | Vulcanization accelerator (2) |  | 0.5 | 0.5 | 0.5 | 0.5 | 0.5 | 0.5 | 0.5 | 0.5 | 0.5 | 0.5 | 0.5 |
| Evaluation | Fuel economy index |  | 108 | 105 | 109 | 109 | 109 | 110 | 110 | 110 | 114 | 115 | 100 |
|  | Wet grip performance index |  | 102 | 100 | 101 | 101 | 104 | 103 | 102 | 103 | 102 | 102 | 100 |
|  | Abrasion resistance index |  | 106 | 107 | 113 | 111 | 110 | 109 | 117 | 116 | 112 | 112 | 100 |
|  | Processability index |  | 98 | 98 | 98 | 97 | 95 | 97 | 95 | 95 | 96 | 96 | 100 |

TABLE 4

|  |  |  | Comparative Example | Examples |  |  |  |  |  |  |  |  |  |
|---|---|---|---|---|---|---|---|---|---|---|---|---|---|
|  |  |  | 3 | 21 | 22 | 23 | 24 | 25 | 26 | 27 | 28 | 29 | 30 |
| Formulation (part(s) by mass) | NR |  | 30 | 30 | 30 | 30 | 30 | 30 | 30 | 30 | 30 | 30 | 30 |
|  | Polymer | Number | (22) | (23) | (24) | (25) | (26) | (27) | (28) | (29) | (30) | (31) | (32) |
|  |  | Amount | 70 | 70 | 70 | 70 | 70 | 70 | 70 | 70 | 70 | 70 | 70 |
|  | Emulsion-polymerized SBR |  | — | — | — | — | — | — | — | — | — | — | — |
|  | Carbon black |  | 30 | 30 | 30 | 30 | 30 | 30 | 30 | 30 | 30 | 30 | 30 |
|  | Silica |  | 30 | 30 | 30 | 30 | 30 | 30 | 30 | 30 | 30 | 30 | 30 |
|  | Silane coupling agent |  | 2.4 | 2.4 | 2.4 | 2.4 | 2.4 | 2.4 | 2.4 | 2.4 | 2.4 | 2.4 | 2.4 |
|  | Oil |  | 5 | 5 | 5 | 5 | 5 | 5 | 5 | 5 | 5 | 5 | 5 |
|  | Stearic acid |  | 2 | 2 | 2 | 2 | 2 | 2 | 2 | 2 | 2 | 2 | 2 |
|  | Zinc oxide |  | 3 | 3 | 3 | 3 | 3 | 3 | 3 | 3 | 3 | 3 | 3 |
|  | Antioxidant |  | 1 | 1 | 1 | 1 | 1 | 1 | 1 | 1 | 1 | 1 | 1 |
|  | Wax |  | 1 | 1 | 1 | 1 | 1 | 1 | 1 | 1 | 1 | 1 | 1 |
|  | Sulfur |  | 1.5 | 1.5 | 1.5 | 1.5 | 1.5 | 1.5 | 1.5 | 1.5 | 1.5 | 1.5 | 1.5 |
|  | Vulcanization accelerator (1) |  | 1 | 1 | 1 | 1 | 1 | 1 | 1 | 1 | 1 | 1 | 1 |
|  | Vulcanization accelerator (2) |  | 0.5 | 0.5 | 0.5 | 0.5 | 0.5 | 0.5 | 0.5 | 0.5 | 0.5 | 0.5 | 0.5 |
| Evaluation | Fuel economy index |  | 105 | 117 | 112 | 119 | 118 | 119 | 120 | 120 | 122 | 124 | 125 |
|  | Wet grip performance index |  | 103 | 102 | 103 | 102 | 103 | 102 | 105 | 103 | 102 | 103 | 103 |
|  | Abrasion resistance index |  | 102 | 112 | 110 | 113 | 112 | 114 | 111 | 116 | 115 | 116 | 112 |
|  | Processability index |  | 99 | 100 | 100 | 102 | 100 | 100 | 100 | 100 | 100 | 101 | 99 |

|  |  |  | Examples |  |  |  |  |  |  |  |  |  | Comparative Example |
|---|---|---|---|---|---|---|---|---|---|---|---|---|---|
|  |  |  | 31 | 32 | 33 | 34 | 35 | 36 | 37 | 38 | 39 | 40 | 2 |
| Formulation (part(s) by mass) | NR |  | 30 | 30 | 30 | 30 | 30 | 30 | 30 | 30 | 30 | 30 | 30 |
|  | Polymer | Number | (33) | (34) | (35) | (36) | (37) | (38) | (39) | (40) | (41) | (42) | — |
|  |  | Amount | 70 | 70 | 70 | 70 | 70 | 70 | 70 | 70 | 70 | 70 | — |
|  | Emulsion-polymerized SBR |  | — | — | — | — | — | — | — | — | — | — | 70 |
|  | Carbon black |  | 30 | 30 | 30 | 30 | 30 | 30 | 30 | 30 | 30 | 30 | 30 |

TABLE 4-continued

| | | | | | | | | | | | | |
|---|---|---|---|---|---|---|---|---|---|---|---|---|
| | Silica | 30 | 30 | 30 | 30 | 30 | 30 | 30 | 30 | 30 | 30 | 30 |
| | Silane coupling agent | 2.4 | 2.4 | 2.4 | 2.4 | 2.4 | 2.4 | 2.4 | 2.4 | 2.4 | 2.4 | 2.4 |
| | Oil | 5 | 5 | 5 | 5 | 5 | 5 | 5 | 5 | 5 | 5 | 5 |
| | Stearic acid | 2 | 2 | 2 | 2 | 2 | 2 | 2 | 2 | 2 | 2 | 2 |
| | Zinc oxide | 3 | 3 | 3 | 3 | 3 | 3 | 3 | 3 | 3 | 3 | 3 |
| | Antioxidant | 1 | 1 | 1 | 1 | 1 | 1 | 1 | 1 | 1 | 1 | 1 |
| | Wax | 1 | 1 | 1 | 1 | 1 | 1 | 1 | 1 | 1 | 1 | 1 |
| | Sulfur | 1.5 | 1.5 | 1.5 | 1.5 | 1.5 | 1.5 | 1.5 | 1.5 | 1.5 | 1.5 | 1.5 |
| | Vulcanization accelerator (1) | 1 | 1 | 1 | 1 | 1 | 1 | 1 | 1 | 1 | 1 | 1 |
| | Vulcanization accelerator (2) | 0.5 | 0.5 | 0.5 | 0.5 | 0.5 | 0.5 | 0.5 | 0.5 | 0.5 | 0.5 | 0.5 |
| Evaluation | Fuel economy index | 115 | 111 | 115 | 117 | 117 | 116 | 118 | 118 | 122 | 123 | 100 |
| | Wet grip performance index | 102 | 102 | 103 | 103 | 105 | 105 | 104 | 104 | 104 | 103 | 100 |
| | Abrasion resistance index | 107 | 108 | 115 | 113 | 112 | 112 | 119 | 118 | 114 | 114 | 100 |
| | Processability index | 98 | 97 | 96 | 95 | 96 | 95 | 97 | 94 | 94 | 95 | 100 |

Tables 3 and 4 show that in the rubber compositions of examples each containing a polymer having a polar group at an end, compared with the rubber compositions of Comparative Examples 1 and 3 each containing a polymer not having a polar group at an end, the fuel economy, wet grip performance, and abrasion resistance were improved in a balanced manner, and good processability was also maintained.

The invention claimed is:

1. A pneumatic tire comprising a diene polymer, which diene polymer is obtained by radical polymerization of at least one radical polymerizable monomer in the presence of at least one polar functional group-containing thiol compound, has a peak top molecular weight of 150,000 to 500,000, and has a polar functional group at at least one end.

2. The pneumatic tire according to claim 1, wherein the polar functional group-containing thiol compound is represented by formula (1):

$$X—R^1—SH \quad (1)$$

wherein X represents an ester group, a hydroxyl group, a carboxyl group, an amino group, or an alkoxysilyl group, and $R^1$ represents an alkylene or arylene group which may have a substituent.

3. The pneumatic tire according to claim 1 or 2, which has a polar functional group at a main chain and at least one end.

4. The pneumatic tire according to claim 1, wherein the radical polymerizable monomer is a combination of at least one diene monomer and at least one styrene monomer.

5. The pneumatic tire according to claim 1, wherein the radical polymerizable monomer is a combination of at least one diene monomer, at least one styrene monomer, and at least one polar functional group-containing monomer.

* * * * *